United States Patent

Kellog

[11] Patent Number: 5,411,012
[45] Date of Patent: May 2, 1995

[54] COMBUSTION HEATER

[75] Inventor: Larry D. Kellog, Turlock, Calif.

[73] Assignees: Fred A. Tull; Rosa B. Tull, both of Prosser, Wash.

[21] Appl. No.: 132,033

[22] Filed: Oct. 5, 1993

[51] Int. Cl.⁶ .......................................... A01G 13/06
[52] U.S. Cl. ..................................... 126/59.5; 431/1
[58] Field of Search ............... 126/59.5, 60, 61, 58; 431/1, 122, 351, 353; 47/2

[56] References Cited

U.S. PATENT DOCUMENTS

| | | | |
|---|---|---|---|
| 4,642,046 | 12/1987 | Saito et al. | 431/1 |
| 4,770,626 | 9/1988 | Zinn et al. | 431/1 |
| 5,010,872 | 4/1991 | Kish | 126/59.5 |

Primary Examiner—Larry Jones
Attorney, Agent, or Firm—Jensen & Puntigam

[57] ABSTRACT

A propane heater suitable for orchards, having a cylindrical combustion chamber and an exhaust tube which extends from one end thereof, the exhaust tube being substantially longer than the combustion chamber. A fuel inlet is located in the cylindrical surface of the combustion chamber at the other end thereof, at approximately 30° from top dead center thereof. An ignition and air supply tube is located approximately 80°–110° circumferentially away from the fuel inlet, past the top dead center of the chamber.

4 Claims, 1 Drawing Sheet

COMBUSTION HEATER

TECHNICAL FIELD

This invention relates generally to combustion heaters, in particular propane heaters which are used for orchard heaters and other similar applications, and more specifically concerns a combustion heater which produces heated air.

BACKGROUND OF THE INVENTION

Fruit orchards are often subject to frost or freezing conditions which result in damage to the fruit or the buds/blossoms. There are several well known ways for preventing such damage, including wind machines, which move the cold air which collects about the trees, large sprayers which spray the fruit with water, and heaters of various types. An example of an orchard heater which produces heated steam is shown in U.S. Pat. No. 5,010,872 to Kish et al. That heater uses liquid propane to produce very moist hot air which is useful in protecting fruit trees from frost damage, including in particular damage to buds and blossoms. However, that heater has proven to have some difficulties with ignition and is rather cumbersome to ignite efficiently when a large number of such heaters must be ignited in succession.

A related need concerns efficient heating for large, enclosed spaces (but well-ventilated), such as manufacturing plants, automobile repair shops, etc. In these environments, an efficient source of heated dry air is desirable.

In both situations, convenient ignition and reliable and efficient operation are important, as well as the overall economy of the apparatus and the durability thereof.

DISCLOSURE OF THE INVENTION

Accordingly, the present invention is a combustion heater which includes a closed, cylindrical combustion chamber having a cylindrical surface and first and second opposing ends; an elongated exhaust tube which extends from the first end of the combustion chamber; a fuel inlet in the cylindrical surface near the second end of the combustion chamber for receiving vaporized fuel in the combustion chamber, the fuel inlet being located at a point which is in one of two upper circumferential quadrants of the combustion chamber; an ignition and air supply tube located near the second end of the combustion chamber in the other upper circumferential quadrant of the combustion chamber, wherein the fuel inlet and the ignition and air supply tube are separated by an angle in the range of 60°–120°; and a plurality of legs for support of the apparatus.

BEST MODE FOR CARRYING OUT THE INVENTION

Figure 1:
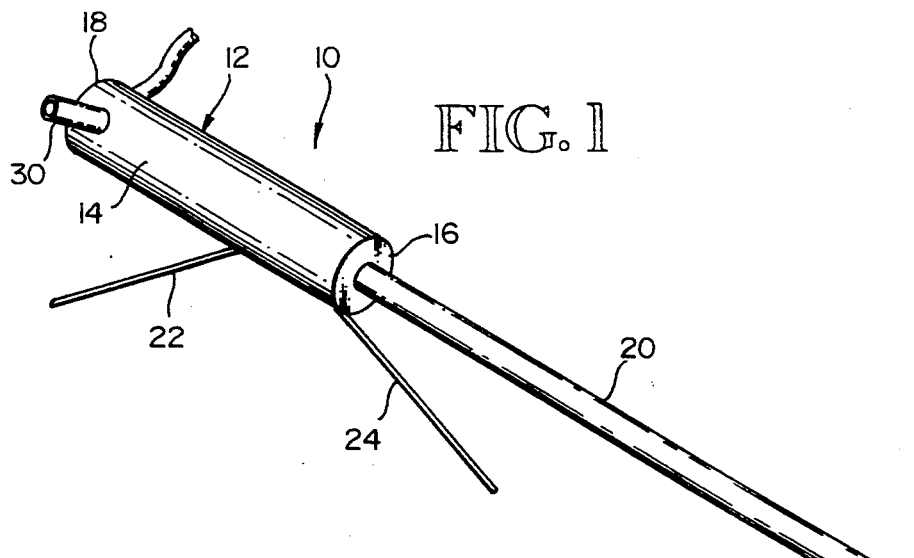
FIG. 1 is a schematic view of the heater of the present invention.
Figure 2:
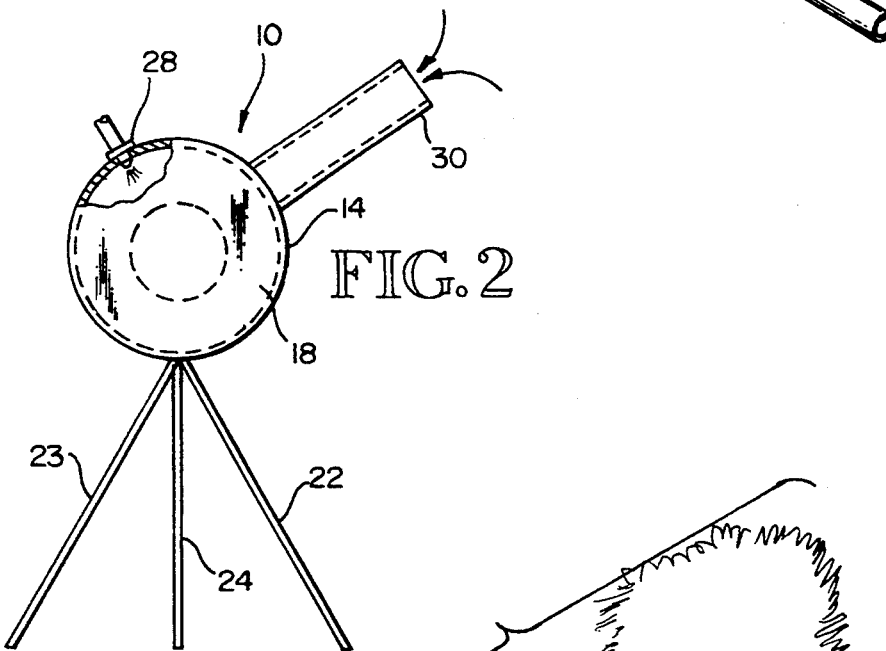
FIG. 2 is an end elevational view of the heater of the present invention.

Referring to FIGS. 1 and 2, the heater of the present invention is shown generally at 10. Heater 10 includes a combustion chamber 12 which in the embodiment shown comprises a cylinder 14 approximately 20 inches long and 4 inches in diameter. Cylinder 14 is made from steel with a wall approximately ¼-inch thick. The opposing ends of the cylinder are closed off with circular end plates 16 and 18, with each end plate having a diameter approximately equal to the outside diameter of cylinder 14 and welded thereto. The end plates 16 and 18 are also steel, and are also approximately ¼-inch thick.

In the center of end plate 16 is an opening approximately 1-¼ inches in diameter which receives one end of an exhaust tube 20. In the embodiment shown, exhaust tube 20 is approximately 40 inches long, approximately 1-¼ inches in diameter and has a wall thickness of approximately 0.065 inch. Exhaust tube 20 is made from steel and is welded to end plate 16 such that tube 20 extends parallel with combustion chamber 12, outwardly away therefrom.

Supporting the combination of the combustion chamber 12 and the exhaust tube 20 are three spaced legs 22–24. Each leg is approximately 18 inches long and has a ⅜-inch diameter. The legs 22–24 are also made of steel. Legs 22 and 23 are attached to combustion chamber 12 near the front end thereof and extend downwardly and backwardly toward the rear end thereof at an angle of approximately 30°. Legs 22 and 23 splay slightly outwardly from their point of attachment to the combustion chamber such that at their free ends, they are separated by a distance of approximately 14 inches. Leg 24 in the embodiment shown is attached at one end to combustion chamber 12 in the vicinity where legs 22 and 23 are also attached and extends forwardly of the heater, also at an angle of approximately 30°. Leg 24 extends directly forwardly so that it terminates underneath exhaust tube 20. Hence, legs 22–24 provide a solid, tripod-like support for the heater 10.

The tripod leg embodiment shown in FIGS. 1 and 2 is particularly effective for hillside use i.e, where the ground is somewhat uneven. In other situations, however, such as where the ground is more level, the forward leg 24 may be located such that it extends from the exhaust tube 20, near the forward end thereof, to the ground. Still other leg arrangements are possible within the scope of the present invention.

Fuel, typically vaporized propane, is supplied to the combustion chamber 12 through a nozzle element 28 located in the wall of cylinder 14 near the rear end of the combustion chamber. In the embodiment shown, the nozzle orifice is approximately 1/16 inch in diameter. Nozzle 28 is conventional and receives a fuel line 30. In the particular embodiment shown, the location of nozzle 28 is, referring to FIG. 2, preferably approximately 10°–40° counterclockwise from the top dead center 32 of cylinder 14 and approximately two inches from the rear end.

In the embodiment shown, an ignition/air supply tube 30 extends from cylinder 14 at an angle within the preferred range of 80°–110° clockwise from fuel nozzle 28. The ignition/air tube 30 also is located approximately two inches from the rear end of combustion chamber 12. The tube 30 is approximately four to six inches long and has an internal diameter of approximately 1 ¼ inch. The tube 30 is welded to the combustion chamber wall about an opening of approximately 1 ¼ inches.

The above arrangement of the fuel nozzle and the ignition tube can be varied somewhat. The ignition tube will be located in one of the top quadrants of the circumference of the combustion chamber and the nozzle will be located in the other top quadrant. They will always be spaced so as to achieve that relationship, approximately within the range of 60°–120°, preferably 80°–110°.

Figure 3:
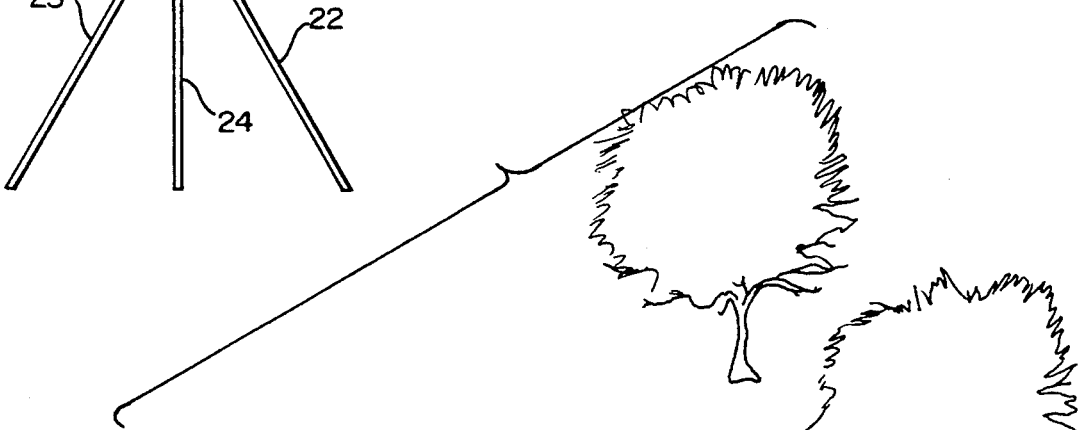
FIG. 3 is a view of the heater of the present invention shown in operation in an orchard.
Figure 3:
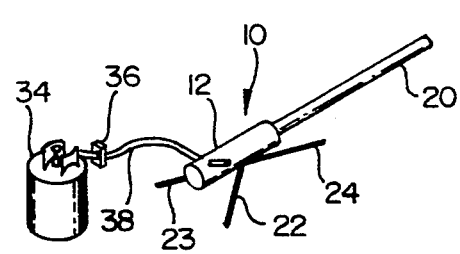

Such an arrangement of fuel nozzle and ignition/air tube 30 provides unexpected improvement in the ease and convenience of ignition, especially when a large number of heaters are arranged in a row, as well as improvement in the combustion efficiency of the heater. FIG. 3 shows the heater of the present invention in an orchard context. The source of fuel is a propane tank 34. The propane fuel, which is typically in liquid form in tank 34, is first vaporized by a conventional vaporizer 36. Both tank 34 and vaporizer 36 are shown representationally. The tank 34 typically services a large number of heaters. The vaporized fuel is directed through fuel line 38 to heater 10. The fuel is directed into the combustion chamber 12 of the heater through fuel nozzle 28. Typically, as indicated above, there will be a large number of the heaters arranged in rows throughout an orchard. The technician simply moves along a row of heaters, igniting each in turn. The particular structural arrangement of the heater permits the system of heaters to be lit quickly, safely and conveniently without any lost motion or effort.

In operation, fuel coming into the combustion chamber is ignited through tube 30, such as by a torch or the like. Rapid combustion occurs, with fuel and air being drawn into the combustion chamber in a rapidly pulsating fashion. The heater operates at pressures of approximately 3–30 psi. The combustion action produces heated air which discharges into the atmosphere through exhaust tube 20. The heaters will typically be used during frost or freezing conditions. This can be for a relatively short time, such as during an evening or overnight, or for a longer time, i.e. several days.

In addition to the orchard application shown in FIG. 3, the heater of the present invention is useful in other applications, such as manufacturing or assembly facilities which are well ventilated. The heated air produced by the heater 10 warms the enclosed ventilated space to the desired temperature, at which point it can be conveniently turned off by various means.

While the heater described herein has some similarity to existing heaters, the particular location and relative arrangement of the fuel nozzle and the ignition/air supply tube in the combustion chamber leads to improved convenience in ignition and is more efficient.

Although a preferred embodiment has been disclosed for purposes of illustration, it should be understood that various changes, modifications and substitutions may be made in such embodiment without departing from the spirit of the invention which is defined by the claims which follow.

What is claimed is:

1. A combustion heater, comprising:
   a closed, cylindrical combustion chamber having a cylindrical surface portion and first and second opposing ends, the cylindrical surface portion having two upper and two lower circumferential quadrants;
   an elongated exhaust tube extending from the first end of the combustion chamber;
   a fuel inlet in the cylindrical surface portion near the second end of the combustion chamber for receiving vaporized fuel into the combustion chamber, the fuel inlet being located at a point which is in one of said two upper circumferential quadrants of the cylindrical surface portion, said fuel inlet point being approximately 10° to 40° circumferentially removed from a highest circumferential point on the cylindrical surface portion;
   an ignition and air supply tube located near the second end of the combustion chamber in the other upper circumferential quadrant of the cylindrical surface portion, wherein the fuel inlet and the ignition and air supply tube are separated by an angle in the range of 80°–100°; and
   a plurality of legs for support of the apparatus.

2. An apparatus of claim 1, wherein the fuel inlet and the ignition and air supply tube are in the same cross-sectional plane.

3. An apparatus of claim 1, wherein the fuel inlet has an orifice approximately 1/16 inch in diameter and wherein the ignition and air supply tube has an internal diameter of approximately 1-¼ inches and a length within the range of 4–6 inches long.

4. An apparatus of claim 1, wherein the heater operates at a pressure within the range of 3–30 psi.

* * * * *